(12) United States Patent
Werth et al.

(10) Patent No.: US 12,141,120 B1
(45) Date of Patent: Nov. 12, 2024

(54) TEMPORARY LOCKING MECHANISM WITH SHARED ASSIGNMENT TABLE

(71) Applicant: SAP SE, Walldorf (DE)

(72) Inventors: Thomas Werth, Speyer (DE); Juliane Wagner, Angelbachtal (DE); Jibi Joseph Vadakayil, Sankt Leon Rot (IN); Stefan Siebert, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/312,686

(22) Filed: May 5, 2023

(51) Int. Cl.
*G06F 17/30* (2006.01)
*G06F 16/23* (2019.01)

(52) U.S. Cl.
CPC .................... *G06F 16/2343* (2019.01)

(58) Field of Classification Search
CPC ........ G06F 16/13; G06F 16/24; G06F 16/156; G06F 17/30; G06F 3/06; G06F 12/0269; G06N 3/00; G06N 5/00; G05B 13/00; G06Q 40/02

See application file for complete search history.

(56) References Cited

U.S. PATENT DOCUMENTS

| | | | | |
|---|---|---|---|---|
| 6,766,399 B1* | 7/2004 | Plummer | ............... | G06F 3/0671 710/260 |
| 8,661,436 B2* | 2/2014 | McKenzie | ............... | G06F 21/79 718/1 |
| 10,096,065 B2* | 10/2018 | Little | ..................... | G06Q 40/02 |
| 11,620,866 B1* | 4/2023 | Goetz | ................ | G07C 9/00912 705/44 |
| 11,693,690 B2* | 7/2023 | Brewer | ................. | G06F 9/3004 718/101 |
| 11,853,448 B1* | 12/2023 | Bhuyan | ............... | G06F 21/6218 |
| 2012/0110288 A1* | 5/2012 | Lehr | ..................... | G06F 12/023 711/170 |
| 2013/0138614 A1* | 5/2013 | Travis | ................... | G06F 16/278 707/658 |

(Continued)

OTHER PUBLICATIONS

Anonymous: "Record locking—Wikipedia", Feb. 25, 2014 (Feb. 25, 2014), XP55488225A, Retrieved from the Internet: URL:https://en.wikipedia.org/2/index.php?title=Record_locking&oldid=597030970, [retrieved on Jun. 27, 2018], (pp: 1-3, 3 total pages)

(Continued)

*Primary Examiner* — Hung D Le
(74) *Attorney, Agent, or Firm* — Buckley, Maschoff & Talwalker LLC

(57) ABSTRACT

The example embodiments are directed to systems and methods of a locking mechanism for a database which permits a partial quantity assignment of a data item to a database request. In one example, the method may include receiving a database request comprising a requested quantity value of a data item, setting an exclusive lock on the data item within a database, protecting the requested quantity value by posting a TQA to a table, wherein the TQA comprises an identifier of the requested quantity value, an identifier of the database request, and a timestamp, releasing the exclusive lock for the database request on the data item within the database in response to recording the TQA, and with the exclusive lock released, determining a quantity value of the data item which is available for the database request and confirming the determined quantity via the temporary quantity assignment table.

20 Claims, 11 Drawing Sheets

(56) References Cited

U.S. PATENT DOCUMENTS

| | | | | |
|---|---|---|---|---|
| 2013/0262423 A1* | 10/2013 | Graefe | ............... | G06F 16/2343 |
| | | | | 707/703 |
| 2013/0297580 A1* | 11/2013 | Markus | ............... | G06F 9/466 |
| | | | | 707/E17.084 |
| 2013/0318058 A1* | 11/2013 | Fries | ............... | G06F 16/2365 |
| | | | | 707/703 |
| 2013/0325827 A1* | 12/2013 | Markus | ............... | G06F 16/23 |
| | | | | 707/703 |
| 2014/0040208 A1* | 2/2014 | Graefe | ............... | G06F 16/2343 |
| | | | | 707/648 |
| 2014/0236913 A1* | 8/2014 | Chakradhar | ............... | G06F 16/2343 |
| | | | | 707/703 |
| 2014/0289483 A1* | 9/2014 | Hosoda | ............... | G06F 12/0835 |
| | | | | 711/152 |
| 2015/0242249 A1* | 8/2015 | Cain, III | ............... | G06F 12/084 |
| | | | | 711/145 |
| 2015/0317183 A1* | 11/2015 | Little | ............... | G06F 16/00 |
| | | | | 707/703 |
| 2016/0147814 A1* | 5/2016 | Goel | ............... | G06F 16/2336 |
| | | | | 707/638 |
| 2018/0276122 A1* | 9/2018 | Bensberg | ............... | G06F 12/0269 |
| 2019/0138624 A1* | 5/2019 | Menendez | ............... | G06F 16/1774 |
| 2019/0155795 A1* | 5/2019 | Xiao | ............... | G06F 9/526 |
| 2019/0258622 A1 | 8/2019 | Chang et al. | | |
| 2020/0125654 A1* | 4/2020 | Ramos | ............... | G06F 16/2365 |
| 2020/0272505 A1* | 8/2020 | Horsnell | ............... | G06F 9/3009 |
| 2022/0012225 A1* | 1/2022 | Liu | ............... | G06F 16/2365 |
| 2022/0414081 A1* | 12/2022 | Ravella | ............... | G06F 16/2365 |
| 2023/0004967 A1* | 1/2023 | Davies | ............... | G06Q 20/401 |
| 2023/0054501 A1* | 2/2023 | Lahiri | ............... | G06F 16/2358 |
| 2023/0230097 A1* | 7/2023 | Burnett | ............... | G06F 11/0745 |
| | | | | 707/703 |
| 2023/0230098 A1* | 7/2023 | Burnett | ............... | G06F 11/0757 |
| | | | | 707/703 |

OTHER PUBLICATIONS

Communication: "The Extended European Search Report", European Patent Office, Sep. 27, 2024 (Sep. 27, 2024) for European Application No. 24173438.3-1203, 8pgs.

* cited by examiner

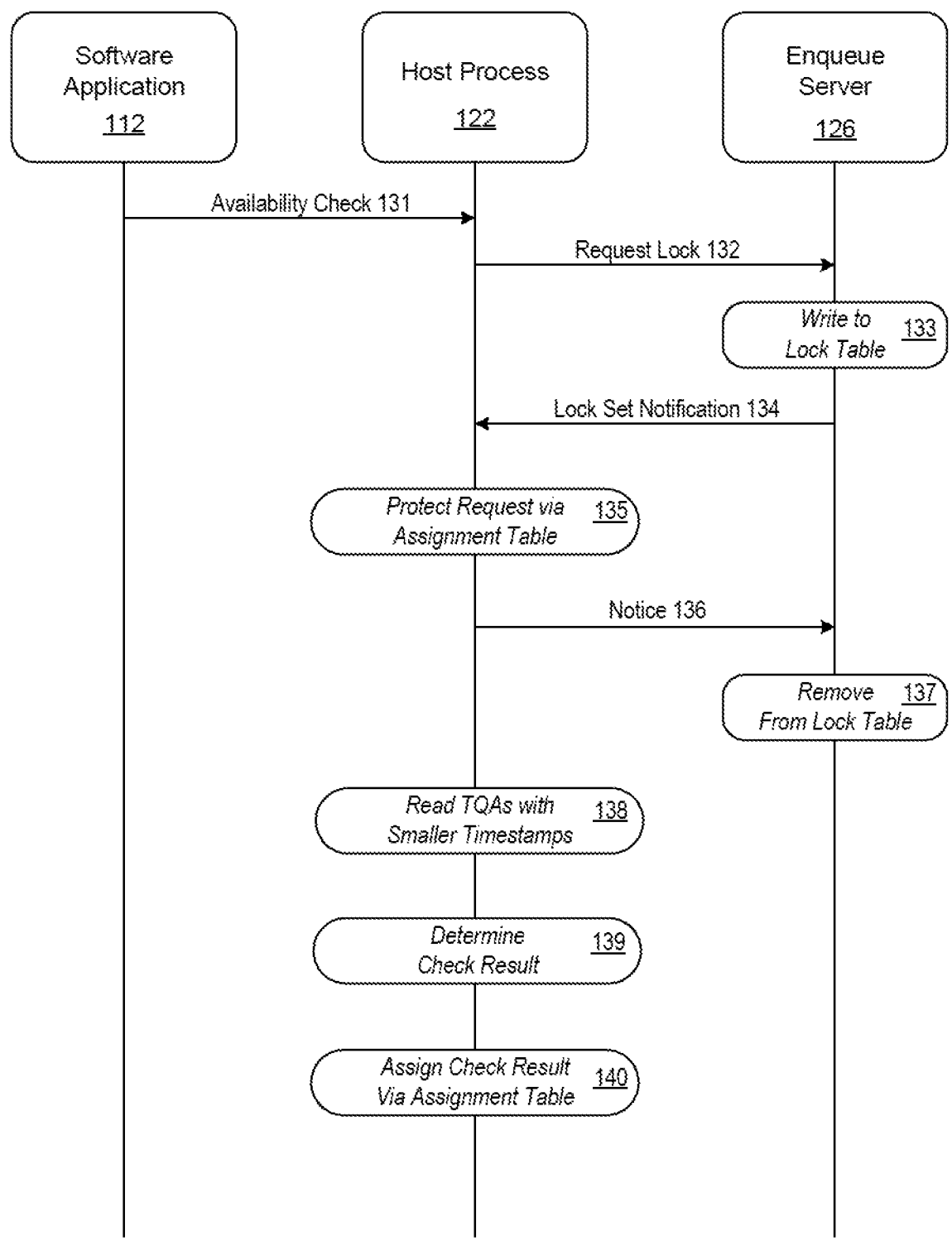

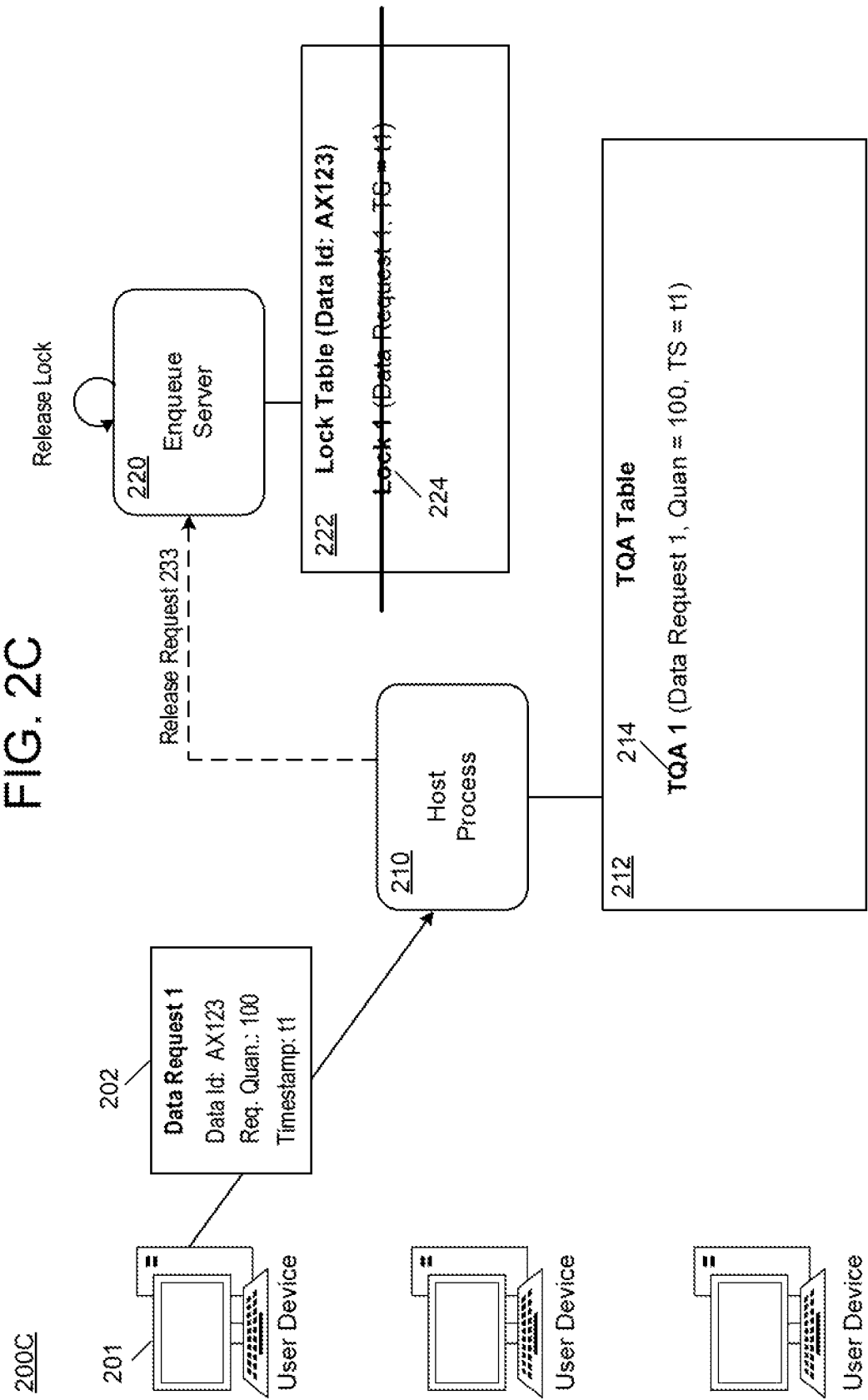

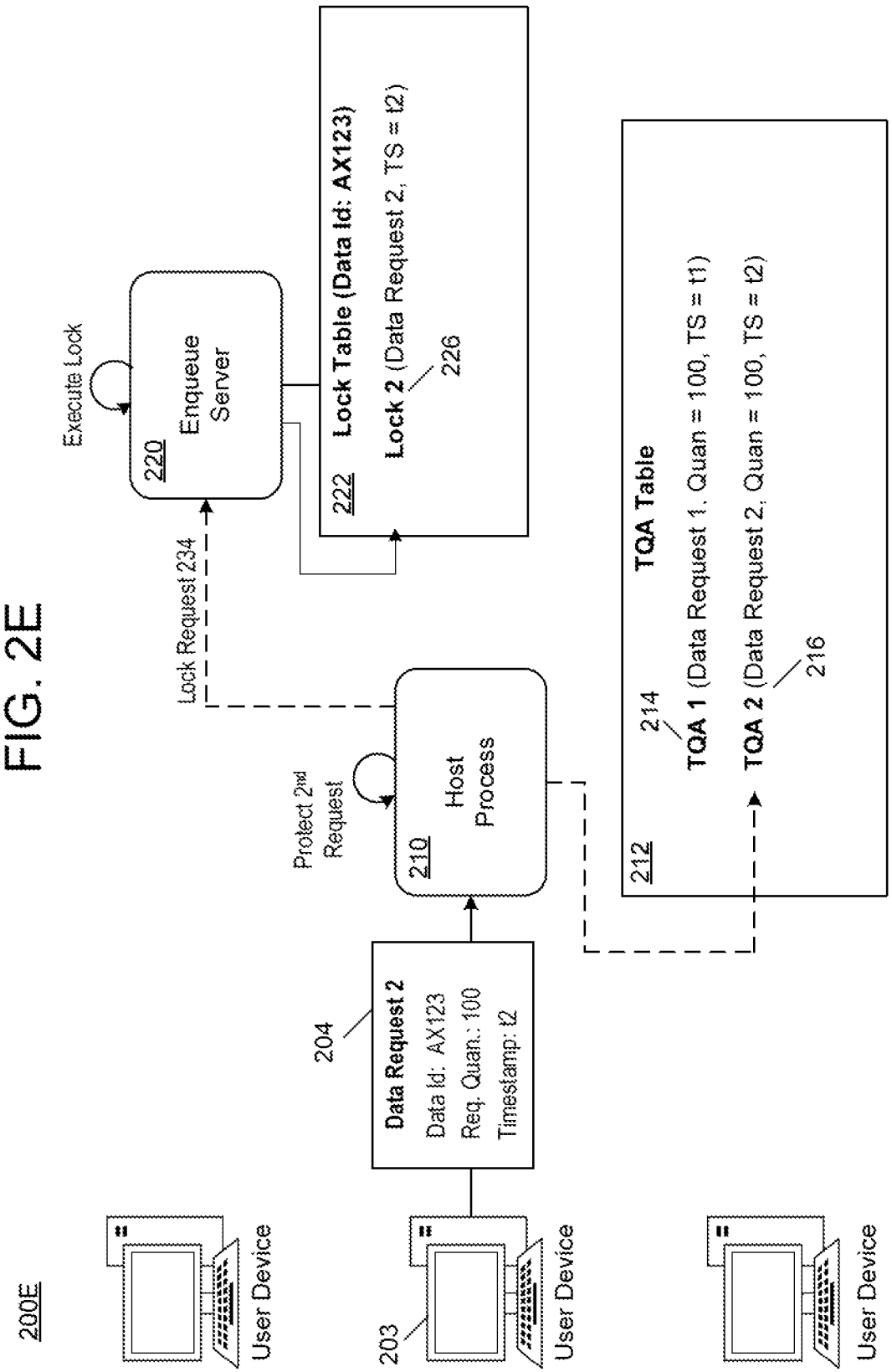

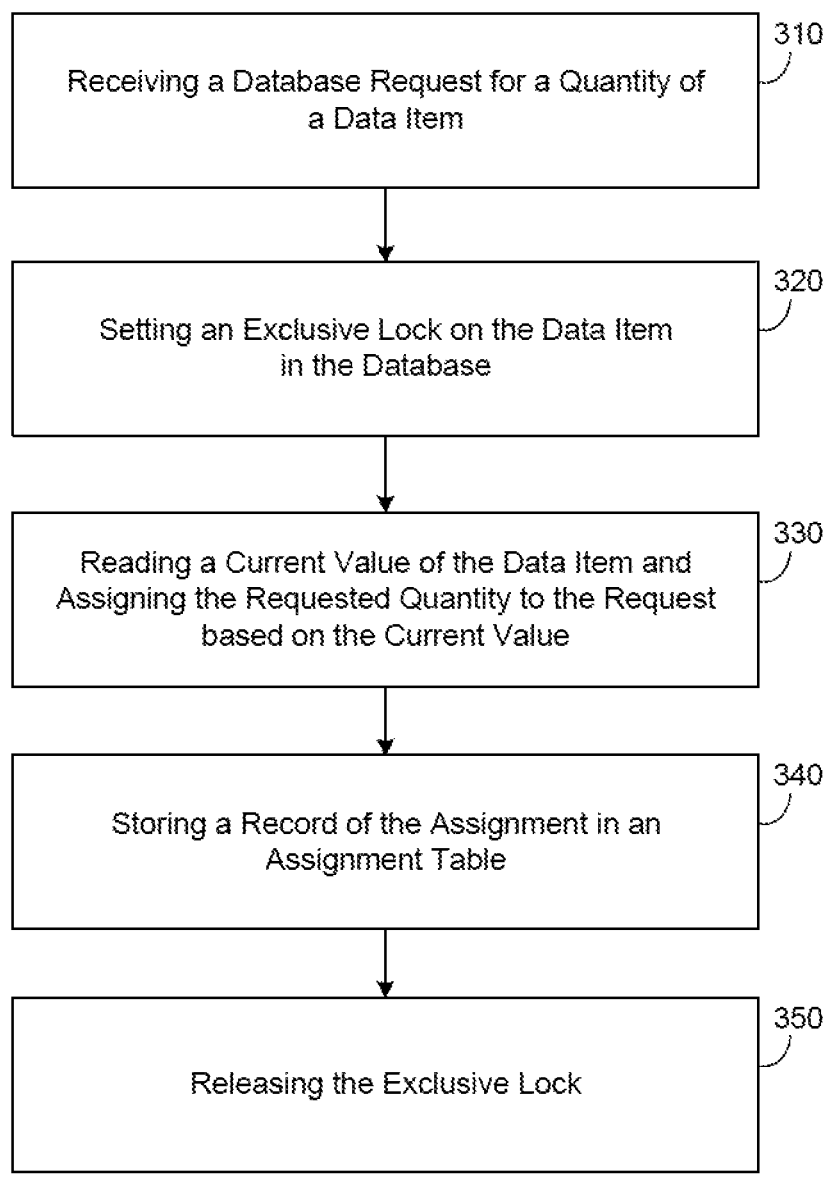

TEMPORARY LOCKING MECHANISM WITH SHARED ASSIGNMENT TABLE

BACKGROUND

When a transaction issued from a software program to a database sets an exclusive lock on a database object, the object in question is only available for this transaction and can only be changed by this transaction via the software program. If a second software program submits a transaction which attempts to perform an exclusive lock on the same database object while the database object is still locked by the previous transaction, the database will reject the second transaction and continue to hold the exclusive lock for the initial transaction. The benefit of an exclusive lock is that it prevents conflicts from occurring and likewise prevents incorrect data from being saved out of order.

However, one of the drawbacks of setting an exclusive lock for an entire complex process is that the exclusive lock stays on the data item from start to finish of the process which could take a significant amount of time. The lock stays on the database object until the software program requests release of the lock. During this waiting period, the underlying data stored in the data object is not available for reading or modification by other programs. For software applications that repeatedly perform locking mechanisms on the database, the exclusive lock can limit the number of requests that can be processed and even cause failures during peak hours of traffic.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1B is a diagram illustrating a process executing the lock based on the temporary assignment via the host platform in accordance with example embodiments.

FIGS. 2A-2D are diagrams illustrating a process of executing a temporary lock and assigning a requested quantity of a data item in response to a first request for a quantity of the data item in accordance with an example embodiment.

FIGS. 2E-2G are diagrams illustrating a process of executing a temporary lock and assigning a partial quantity of the data item in response to a second request for a quantity of the data item in accordance with an example embodiment.

FIG. 3 is a diagram illustrating a method of executing a lock request and assigning a quantity of value in accordance with an example embodiment.

Figure 1A:
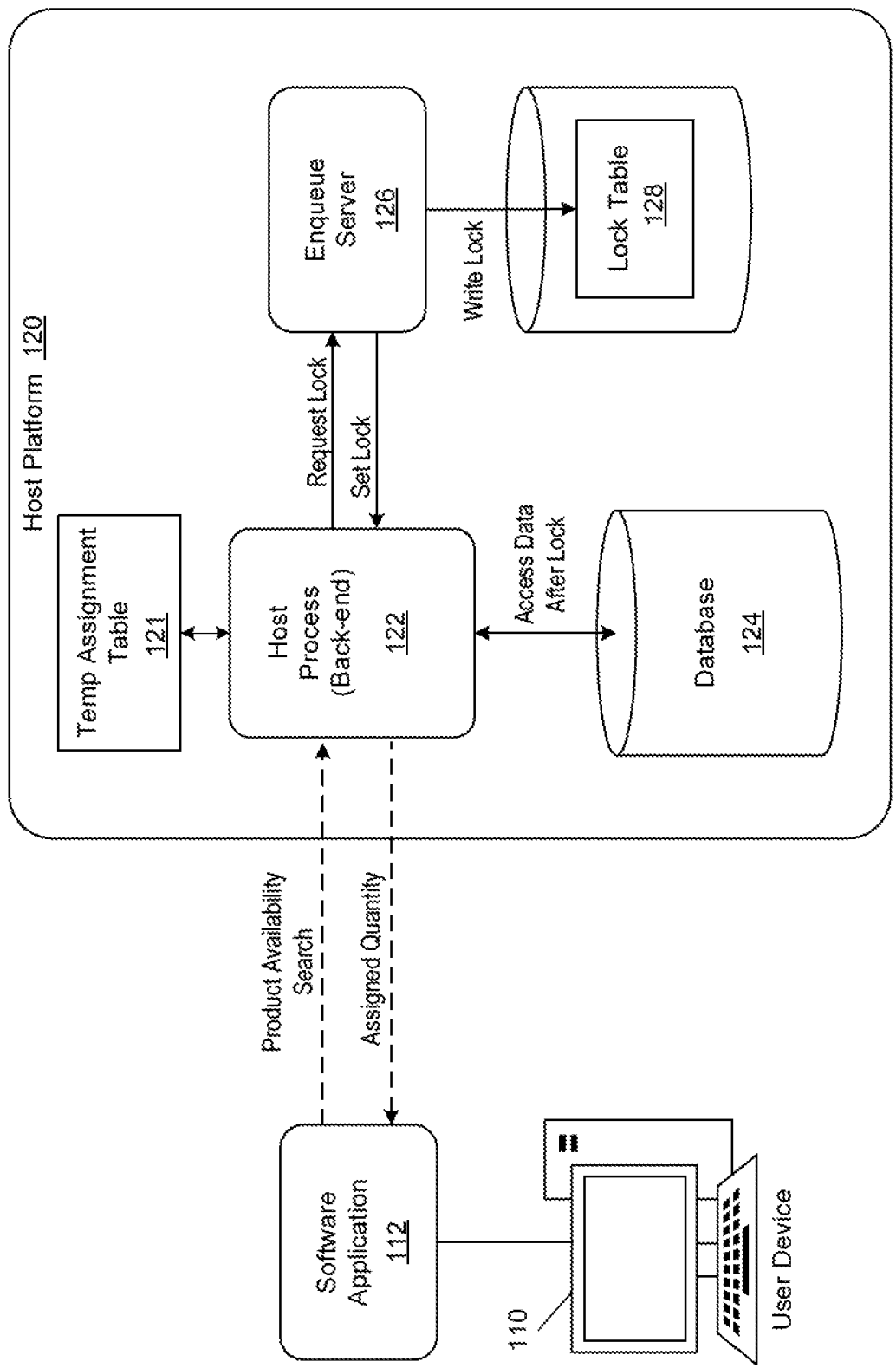
FIG. 1A is a diagram illustrating a computing environment with a host platform for executing a lock and a temporary assignment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Many companies have integrated their daily enterprise resource planning operations into third-party software applications that are hosted by third parties on remote hosts such as cloud platforms, web servers, databases, and the like. As an example, an organization may access a suite of software programs that are hosted by a provider which they can use to manage their business including accounting, supply chain, ordering, sales, and the like. The provider may also host a database where the records of the organization are stored and accessed by the third-party software applications. The provider can also make the software applications accessible to other parties via a website or application hosted at a uniform resource locator (URL). Here, a customer may access products of an organization and view prices and other information by accessing a URL of the organization's website which communicates with the organization's data stored in a back-end database.

As part of this process, a customer may wish to find out how quickly their order can be satisfied. Here, the software application/website being used by the client may offer a "product availability check" feature which enables a customer to query a backend database to find out on which date and in which quantity a particular requirement may be fulfilled. Here, the check may be sent to the backend database to lookup/query an available quantity value of the product from the database. During this process, the backend database may execute a lock on the product data where the data value is stored to ensure that the same quantity is not reserved by another/multiple orders. Here, the lock may be placed on the field or other data record where the product data (e.g., quantity value, etc.) is stored based on a unique identifier of a field, table, column, etc., where the product data is stored in the database. The lock may be performed by the temporary optimistic locking mechanism described herein. However, it should be appreciated that the temporary optimistic locking mechanism described herein may be used in other situations as well and is not limited to being used with an availability check.

The product availability check answers the question of how much quantity of an item can be confirmed. If two programs attempt to perform a product availability check for an availability quantity of a same product at the same time then both programs will read the same available quantity. In this case both programs are requesting a quantity of the product. However, if they do not see each other and if the availability of the item is not enough to satisfy both requests, one or both of the programs may receive a positive answer from the system even though this is not feasible. Accordingly, a lock is necessary for performing a product availability check. Previous approaches to performing a product availability check required an exclusive lock on the product data for the entire duration of an availability check until the final consumption is published. However, this process requires additional time that can significantly increase (e.g., double, triple, etc) the time of the locking process on the product data.

In the example embodiments, the product availability check includes a locking mechanism that temporarily locks on to a data record (e.g., field, cell, column, table, etc.) and releases the lock prior to publishing any consumption of the quantity. In particular, a process may request a product availability check which includes a request for a particular amount of quantity. The request may be sent to a database where the host system described herein can perform a new optimistic locking mechanism within a database. Here, the database may set an exclusive lock on the data record long enough to write a temporary quantity assignment (TQA) to a table there by assigning the entire requested among to the process without checking its actual availability. In addition, a timestamp at when the TQA is assigned may also be stored in the table. Even if there is not enough quantity available for the process, the system still assigns the quantity to the process via the table. Then, the system can release the lock. The product availability check is then performed for the requested quantity after the lock has been released.

During subsequent product availability checks on the same product, the database can preserve the available quantity temporarily assigned to the process in the table but not yet published to other processes in the database by reading all of the entries within the assignment table for the product that have a timestamp of persistence to the TQA table the comes before the timestamp of the TQA assigned to the process, prior to performing the product availability check. The database can subtract the quantity temporarily assigned to other processes in the table (e.g., identified by earlier timestamps in the assignment table, etc.) from the total availability quantity read from the data record prior to determining whether the requested quantity can be confirmed.

Furthermore, with the assignment preserved, the database can release the lock enabling additional processes to perform another product availability check on the data record without having to wait for the assignment to publish which can take another period of time (e.g., 20 ms, 40 ms, 75 ms, etc.) Thus, the use of the temporary assignment table can reduce the total lock time needed for performing a product availability check. The lock can be released before publishing the temporary assignment because the host will consider the temporary assignments in the assignment table when performing subsequent checks.

FIG. 1A illustrates an example of a computing environment 100 with a host platform 120 for executing a lock and a temporary assignment in accordance with an example embodiment and FIG. 1B illustrates a process 130 of executing the lock based on the temporary assignment via the host platform in accordance with example embodiments. In these examples, the host platform 120 may include a server, a cloud platform, a database, a combination of devices and systems, and the like. The host platform 120 may also provide a live runtime environment where third-party applications and host applications are hosted and made available to client devices/user devices over the Internet.

Referring to FIGS. 1A and 1B, a software application 112 is hosted by the host platform 120 and made accessible to users at a uniform resource locator (URL) or other network location. For example, the software application 112 may enable user to perform a product availability search via a host process 122 of the host platform 120. The host process 122 may be a back-end of the software application 112. As another example, the host process 122 may be a service or group of services that are accessible to applications such as the software application 112 via extensions, libraries, APIs, or the like. Here, a user has used a user device 110 to access the software application 112 and interact with underlying data stored in a database 124 via the host process 122. The user may enter a command or otherwise select a button or other graphical element on a graphical user interface of the software application 112 to trigger a product availability search or other type of availability check on a database 124 of the host platform 120 or other connected storage.

In this example, the request (e.g., product availability check) from the software application 112 is transmitted to the host process 122 for retrieving the requested data from the database 124, in 131. The host process 122 may identify a data identifier (e.g., a key, etc.) of the data record (e.g., quantity field) in the database 124 and use the data identifier to request and set a lock (e.g., an exclusive lock, etc.) on the data record within the database 124 in 132.

To set the lock, the host process 122 may transmit a lock request to an enqueue server 126 or other type of lock management system with an identifier of the data item and an identifier of the software application 112. In response, the enqueue server 126 may check that the data item is not currently locked by referring to a lock table 128 of the data item. Each data item within the database 124 may have its own lock table or data items may share a lock table. If no lock is currently present on the data item, in 133, the enqueue server 126 may set a lock for the software application 112 on the data item by writing a lock notification to the lock table 128 which identifies the software application 112, the data item, and a time at which the lock request was received (timestamp). Furthermore, in 134, the enqueue server 126 may notify the host process 122 of the successful lock.

With the lock set, in 135, the host process 122 may protect the request by writing a temporary quantity assignment (TQA) for the request to a temporary quantity assignment table 121 for the data record which includes any amount of quantity that has temporarily been assigned to other programs/applications. The TQA may include an identifier of the requested amount (e.g., requested quantity) and the timestamp of the request. The TQA written in 135 is not an assignment of the requested quantity but rather a posting/notification of the request and a preservation of the order in which the request is received.

After the TQA is written, the lock may be released. For example, in 136, the host process 122 may notify the server of the completion of the protection of the requested quantity and the enqueue server 126 may delete the lock from the lock table 128 in 137 thereby releasing the lock on the data item. Here, the quantity of product that is being "protected" is not being assigned to the request yet because the host process has not confirmed whether such a quantity is even available. However, by recording the TQA, the order in which the request is received is preserved. requested has not been confirmed.

With the lock released, in 138, the host process 122 read all recorded TQAs in the temporary quantity assignment table 121 and identify any TQAs which have a timestamp that is prior to/earlier than the timestamp of the "protected" request from the software application 112 and subtract the quantity values in these earlier TQAs from the available quantity found in the data record stored in the database 124. In this case, the TQAs stored in the temporary quantity assignment table 121 have yet to publish and therefore have not caused the underlying value stored in the data record within the database 124 to change. However, the TQAs with earlier timestamps should be given priority over the request from the software application 112. If not properly seen by the host process 122, there is a chance the too much quantity may be taken out from the available quantity.

According to various embodiment, with the lock released, the host process 122 may subtract any quantity assignments to other processes which are recorded in the temporary quantity assignment table 121 and which have a timestamp prior to the timestamp of the request from the software application 112 to determine a resulting quantity assignment in 139. Furthermore, the host process 122 may adjust the previous entry (i.e., the previous TQA written in 135) to reflect an assignment of an amount of quantity to the request in 140. In this case, the assigned quantity may satisfy the entire requested amount. However, there are also situations where there is some product left, but not enough to satisfy the entire requested amount. For example, the request may include a request for 100 pieces of a product, while only 75 pieces may be available after the analysis in 139. In this case, the host process 122 can assign a partial amount (e.g., pieces) which the system can satisfy and which does not satisfy the entire amount requested, but only a partial amount. If the resulting process does not want the partial amount, they can request a cancellation of the request.

According to various embodiments, the host process 122 may preserve the temporary quantity assignment to the software application in the temporary quantity assignment table 121 in 135 without actually assigning any product to the request until 140. For example, the host process 122 may create/write a new entry into the temporary quantity assignment table 121 which identifies the software application 112, the assigned quantity, and a timestamp of the availability request from the software application 112 in 135. When the host process 122 changes the protected amount to an "assigned" amount in 140, the host process 122 may adjust the previous entry stored in the temporary quantity assignment table 121 in 135 (e.g., update the amount, etc.) and confirm the result without the lock being present. Thus, other programs can access the data item while the host process 122 is writing the TQA to the temporary quantity assignment table 121 in 140.

Figure 2A:
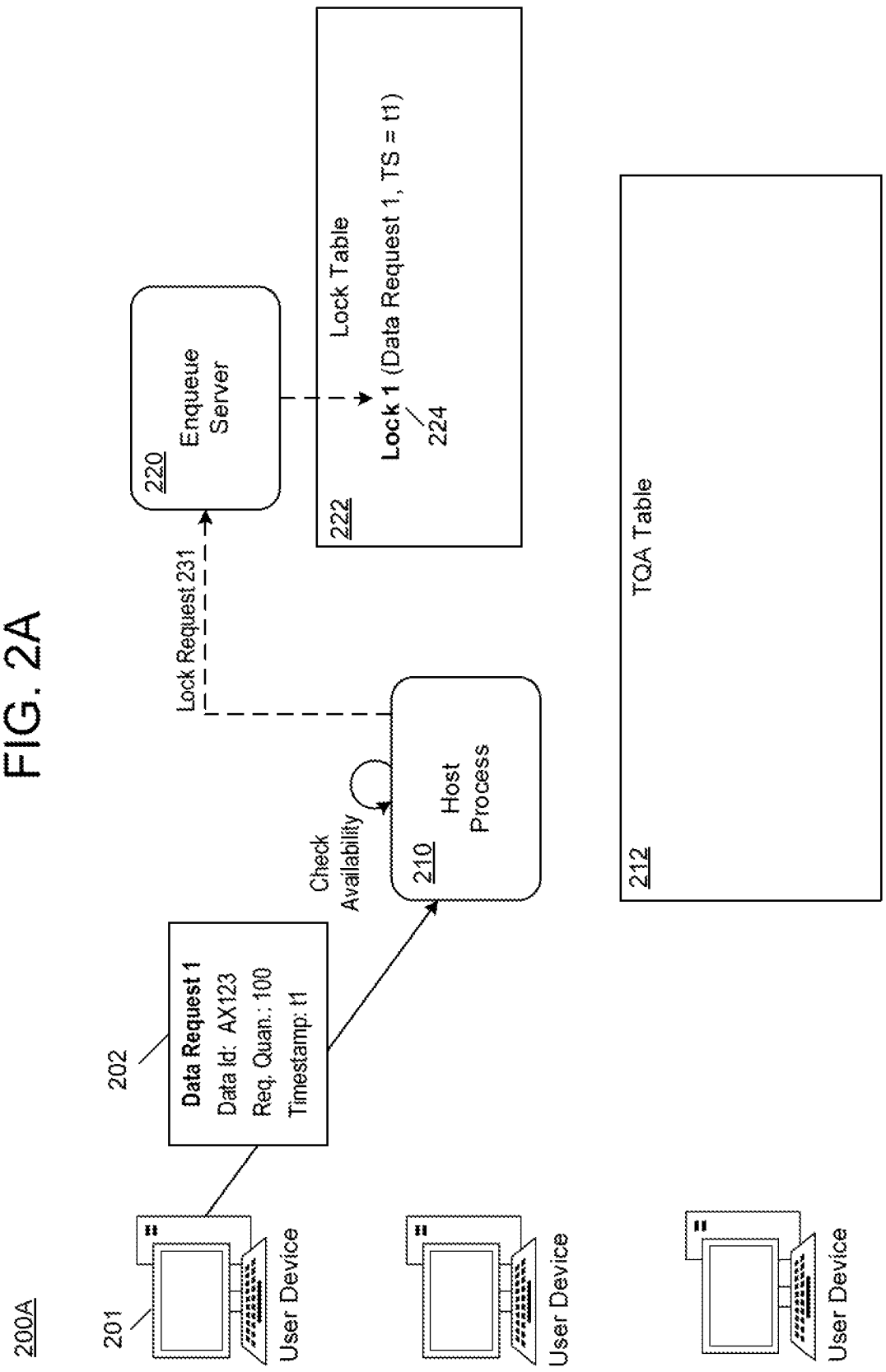

FIGS. 2A-2D illustrate a process of executing a temporary lock and assigning a requested quantity of a data item in response to a first availability request for a quantity of the data item in accordance with an example embodiment. For example, FIG. 2A illustrates a process 200A of a user device 201 requesting a product availability check of a data record corresponding to a product/item stored within a database (not shown) that is managed by a host process 210. For example, the host process 210 may be a back-end of a software application that is accessible to the user device 201 over a network. In this example, the user device 201 submits an availability request 202 which is a message that identifies a data record by its data ID, a requested quantity value (e.g., 100 units), and a timestamp (t1). In this example, the data ID "AX123" may correspond to a product that is being sold by an organization. Here, the data record may store data such as receipts and the like which can be analyzed to determine an available quantity value of the product. The data identifier (e.g., a number, key value, etc.) may be used to find the data record (e.g., a field, a column, a row, a table, etc.) where the availability quantity value of the product is stored in the database.

In response to receiving the availability request 202, the host process 210 may submit a lock request 231 to an enqueue server 220 with an identifier of the data field, a requested quantity, an identifier of the data request or the user, process, application, etc. which submitted the availability request 202, a timestamp of the availability request 202, and the like. In response, the enqueue server 220 may set a lock on the data record within a database by storing a lock entry 224 within a lock table 222 which includes the identifier of the availability request 202 and the timestamp of the availability request 202. If another program, application, user, etc. requests a quantity of the same data record (i.e., AX123) while the lock is pending in the lock table 222, the host process 210 will return an error response or otherwise deny the lock.

Figure 2B:
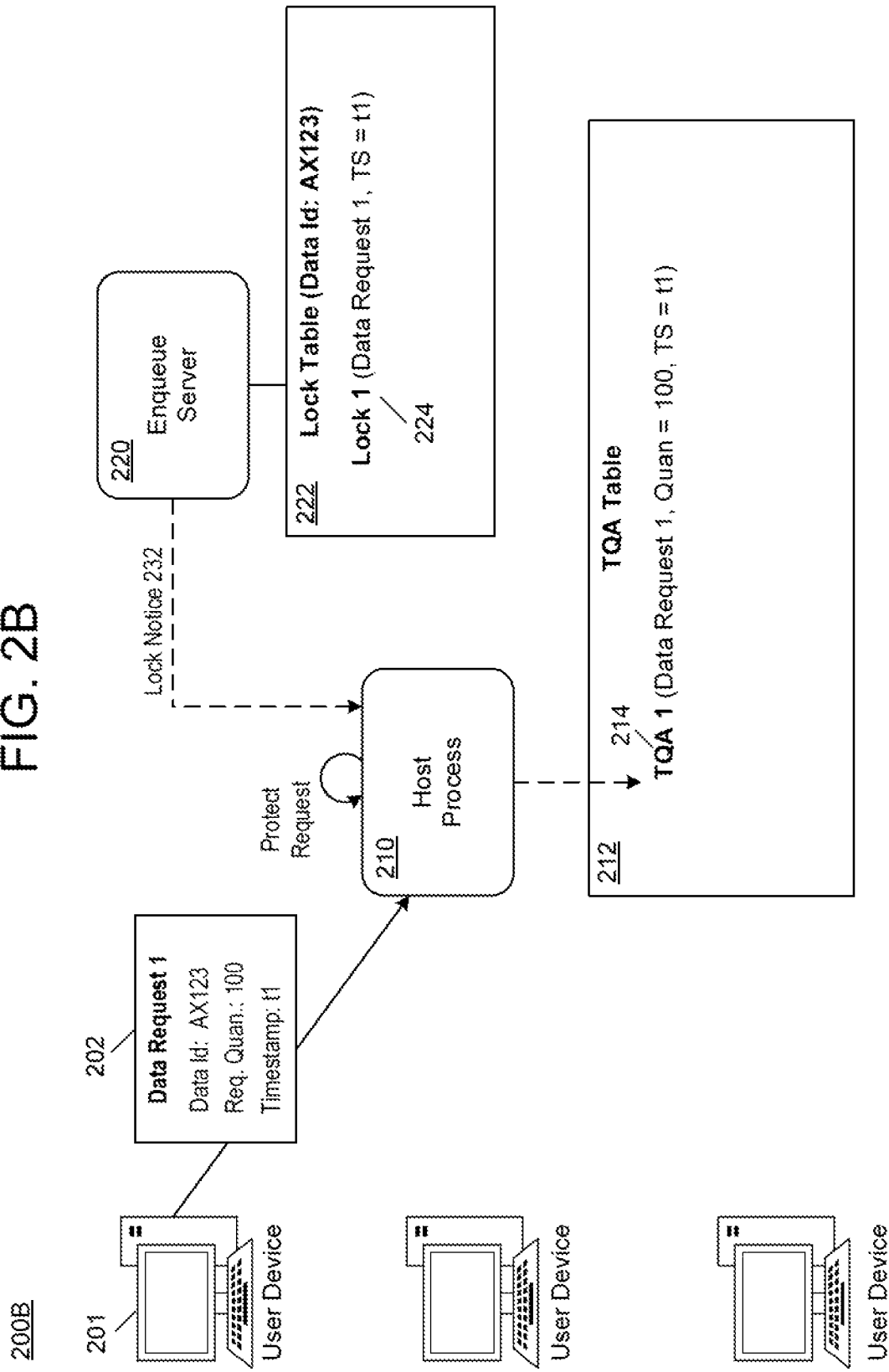

FIG. 2B illustrates a process 200B of preserving the temporary quantity assignment assigned to the availability request 202 within the TQA table 212. In response to the lock being set in the process 200A in FIG. 2A, the host process 210 may protect the availability request 202 by writing an entry of the request into the TQA table 212. The TQA table 212 may be stored in a local memory of the host platform or in a remote storage. As another example, the TQA table may be managed by the enqueue server 220 or another entity. In this example, the host process 210 receives a notification 232 from the enqueue server 220 indicating that the lock has been granted on the data record. In response, the host process records a TQA 214 within the TQA table 212 which identifies the availability request 202 (e.g., user ID, application ID, program ID, etc.) along with a quantity amount requested via the availability request 202, and a timestamp at when the availability request 202 was received. The TQA is a "temporary" quantity assignment of product to the request. However, the amount requested has not been assigned/granted by the database at this point. The TQA 214 is meant to protect the order of the availability request 202 with respect to any subsequently received availability requests.

The TQA table 212 may be used by the host process 210 to manage and keep track of existing temporary quantity assignments of an available quantity of an item (e.g., prior to the assignment being published) in the database. When a temporary quantity assignment of product/quantity to a process "publishes" within the database, the assignment is no longer "temporary". However, in the present application, the host process 210 can release the lock before the temporary quantity assignment publishes because of the TQA table 212 which keeps track of all existing temporary quantity assignments of the quantity available until they publish. Accordingly, the lock on the data record where the available quantity of the data item is stored can be removed before the temporary quantity assignment publishes.

FIG. 2C illustrates a process 200C of releasing the lock on the data record. Referring to FIG. 2C, the host process 210 may transmit a lock release request 233 to the enqueue server 220 in response to writing a TQA 214 which is an entry in the TQA table 212 which preserves the availability request 202 by the database into the TQA table 212. In response, the enqueue server 220 may release the lock on the data record by deleting or otherwise removing the lock entry 224 from the lock table 222 of the data record (AX123). With the lock removed, other processes can now lock onto the data item within the database and perform an availability check simultaneously with the processes performed in FIGS. 2D-2F. The benefit here is that the parallel processes do not see the lock, but rather the optimistic TQA written for the requested quantity. Thus, the parallel processes may also access the product data while the actual availability check is being performed for the previously released lock request.

Figure 2D:
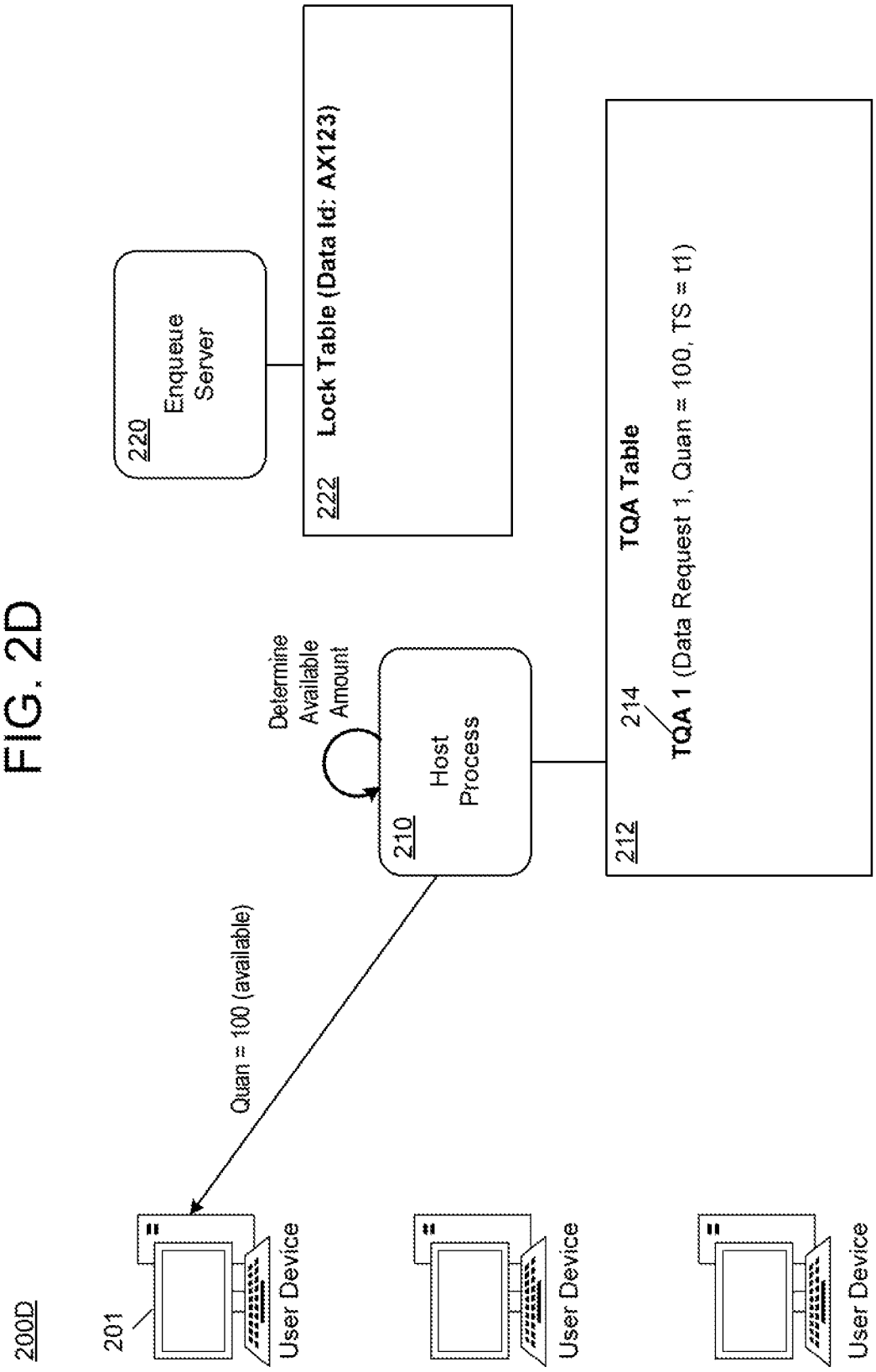

For example, FIG. 2D illustrates a process 200D of determining an available amount of quantity that can be assigned to the availability request 202 and confirming the determination via the TQA table 212. In this example, the host process 210 may read a quantity value of the item from the database. Here, the available quantity may be enough to satisfy the request. For example, the available quantity may be 150 units. Furthermore, the host process 210 may determine whether any TQAs exist in the TQA table 212 which are prior to the TQA 214. In this case, there are no other existing TQAs which have priority over the TQA 214. Therefore, the actual available quantity of the item is the same value as currently stored in the database (i.e., a quantity of 150 units). Accordingly, the host process 210 determines that the entire amount of quantity requested by the availability request 202 can be confirmed. To do so, the host process 210 may modify the TQA 214 with a flag or other indicator to notify that the quantity value has been assigned to the availability request 202.

Figure 2F:
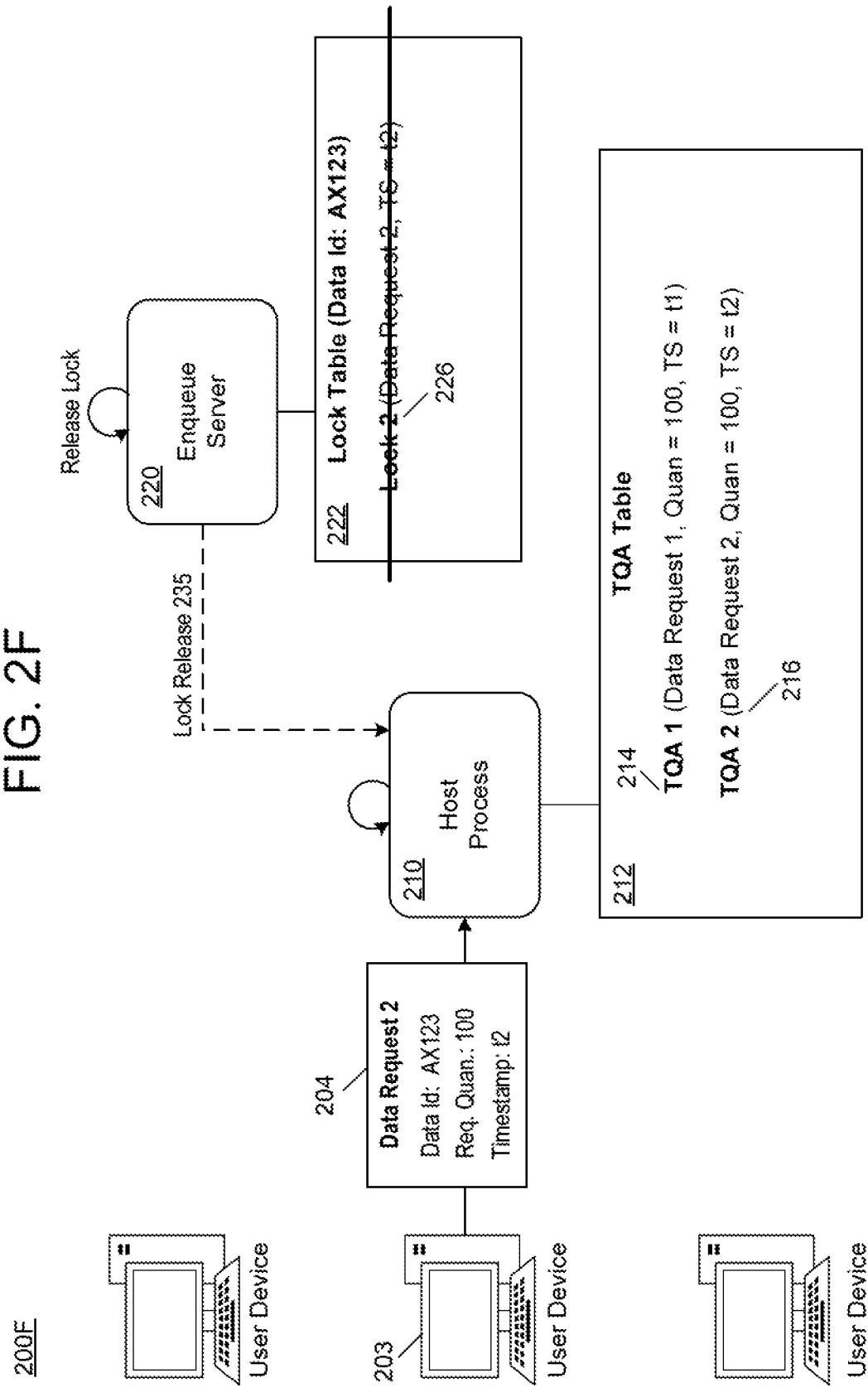
Figure 2G:
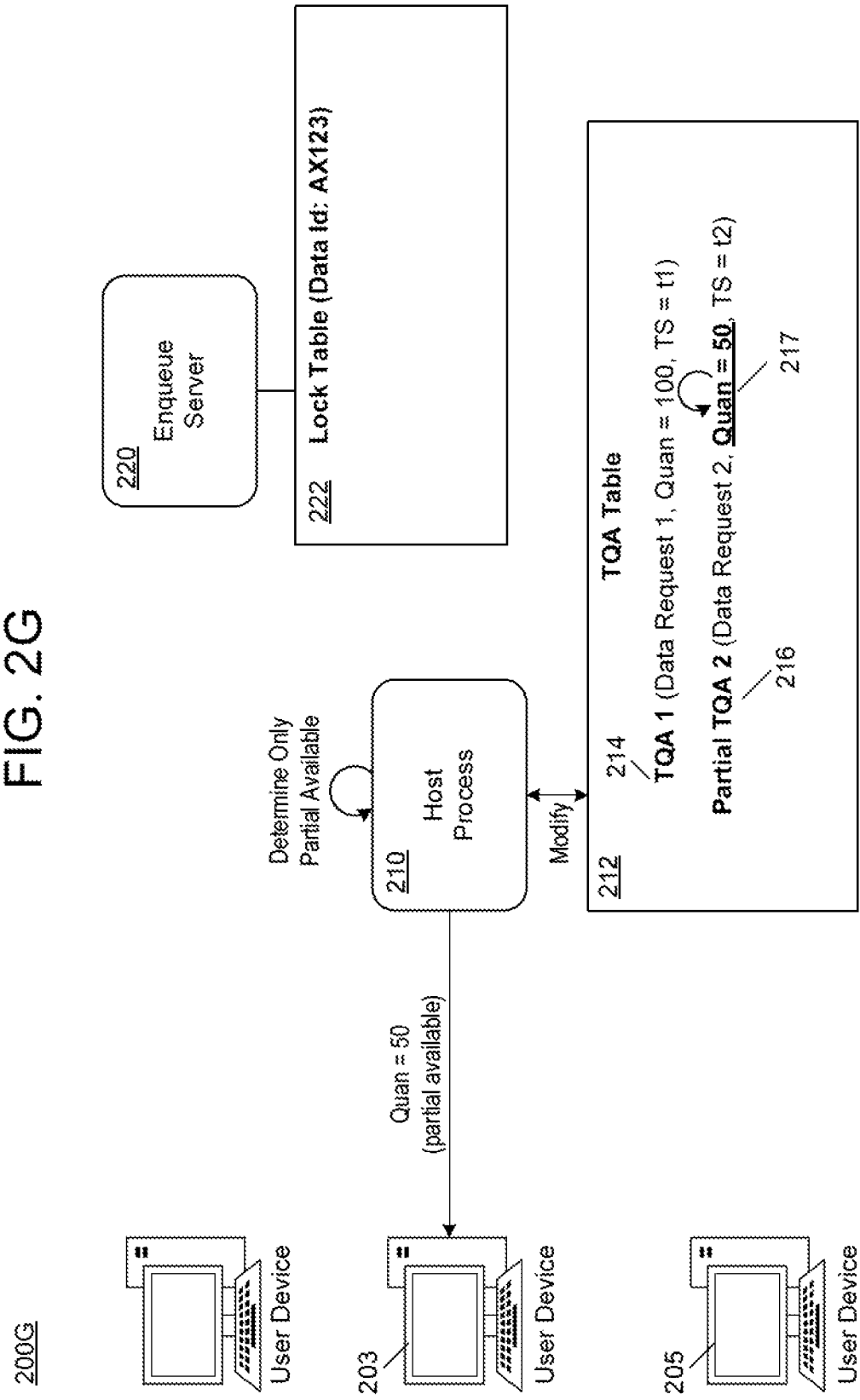

FIGS. 2E-2G illustrate a process of executing a temporary lock and assigning a partial quantity of the data item in response to a second availability request for a quantity of the data item in accordance with an example embodiment. Here, FIG. 2E illustrates a process 200E of receiving an availability request 204 from a user device 203 with an additional product availability check for the same data record (AX123) after the previous lock for the previous availability request has been released in the process of FIG. 2B but before the assigned quantity to the TQA 214 determined in the process 200D of FIG. 2D has published within the database meaning the available product in the database is still listed as 150 units. The availability request 204 includes another requested quantity of the product (100 units). Here, the host process 210 may lock onto the data record by requesting the enqueue server 220 to create and store another lock entry of the data record via the lock table 222. For example, the host process 210 may submit a lock request 234 to the enqueue server 220 with an identifier the data record (AX 123), and a timestamp of the availability request 204. In response, the enqueue server 220 may detect that no lock is currently present on the data record and execute a second lock on the data record by storing an entry 226 within the lock table 222 to identify the lock.

With the data record locked, the host process 210 may then write a TQA 216 of the requested quantity (100 units) to the TQA table 212 to "protect" the requested quantity included in the availability request 204. However, it should be understood that the host process 210 does not assign the availability request 204 the 100 units, yet. However, by storing the TQA 216 with the requested quantity, the host process 210 can preserve the requested quantity over any subsequent requests for the item.

In addition, the host process 210 may add the TQA 216 to the TQA table 212 below the previous entry (the TQA 214). In this case, the TQA 216 includes an identifier of the availability request 204, another partial quantity assignment of the data item to the availability request 204 that satisfies some of the requested quantity but not all of the requested quantity, and a timestamp indicating when the availability request 204 was received. In addition, FIG. 2F illustrates a process 200F of releasing the second lock. Here, the host process 210 transmits a request to release the lock 235 in response to writing the TQA 216 of the second quantity assignment into the TQA table 212. In response, the enqueue server 220 deletes or otherwise releases the lock by removing the entry 226 from the lock table 222.

FIG. 2G illustrates a process 200G of determining an available amount of the item that can be assigned to the availability request 204. In this case, the host process 210 may read the quantity value of the item from the database. Here, the available quantity may be unchanged since the TQA 214 has not published. Thus, 150 unites still appear to be available. Next, the host process 210 may determine whether any TQAs exist in the TQA table 212 which are prior to the TQA 216. In this case, there is an existing TQA (the TQA 214) which has an earlier timestamp and thus has priority over the TQA 216. Therefore, the actual available quantity of the item is the value as currently stored in the database (i.e., a quantity of 150 units) minus the assigned value to the TQA 214 (i.e., a quantity of 100 units) resulting in only 50 units being available for the availability request 204. Accordingly, the host process 210 determines that the entire amount of quantity requested by the availability request 202 cannot be confirmed. To do so, the host process 210 may modify a value 217 (quantity value) within the TQA 216 to confirm the quantity value that has been assigned to the availability request 204.

If a subsequent availability request were to be submitted for the data item from user device 205, the host process 210 determines that there is no product left to handle the requested quantity assignment. Accordingly, the host process 210 can return an error response or other alert to the user device 205. Thus, no lock request is needed and an error response is returned.

FIG. 3 illustrates a method 300 of executing a lock request and assigning a quantity of value in accordance with an example embodiment. For example, the method 300 may be performed by a software application, service, program, application programming interface, and/or combination thereof which are hosted by a host platform such as a cloud platform, a web server, a distributed system, a database, or the like. Referring to FIG. 3, in 310, the method may include receiving a database request comprising a requested quantity value of a data item. For example, the database request may include an availability check such as a product availability check (PAC).

In 320, the method may include setting an exclusive lock for the database request on the data item within a database. In 330, the method may include protecting the requested quantity value by posting a temporary quantity assignment (TQA) for the database request to a table, wherein the TQA comprises an identifier of the requested quantity value, an identifier of the database request, and a timestamp. In 340, the method may include releasing the exclusive lock for the database request on the data item within the database in response to recording the TQA. With the exclusive lock released, in 350, the method may include determining a quantity value of the data item which is available for the database request and confirming the determined quantity via the temporary quantity assignment table.

In some embodiments, the determining may include reading a previously assigned value of the data item to a different database request from the table and determining the quantity value of the data item which is available by subtracting the previously assigned value of the data item from the current value of the data item read from the database. In some embodiments, the determining may include determining that only a partial quantity value of the requested quantity value for the item is available, and confirm the partial quantity value by modifying the TQA posted in the table. In some embodiments, the method may further include transmitting a response to a software application that submitted the database request with an identifier of the confirmed partial quantity value.

In some embodiments, the receiving may include receiving an availability check request from a software application and generating the database request in response to the availability check request. In some embodiments, the method may further include receiving a second database request for the data item comprising a second requested quantity value of the data item after the exclusive lock for the database request has been released, and setting a second exclusive lock on the data item within the database. In some embodiments, the releasing may include releasing the exclusive lock for the database request on the data item within the database after detecting that the requested quantity value has been protected within the table. In some embodiments, the determining may include excluding a quantity value in another TQA stored within the table when determining the quantity value that is available, in response to a timestamp within the assignment record being later in time than the timestamp of the database request.

Figure 4:
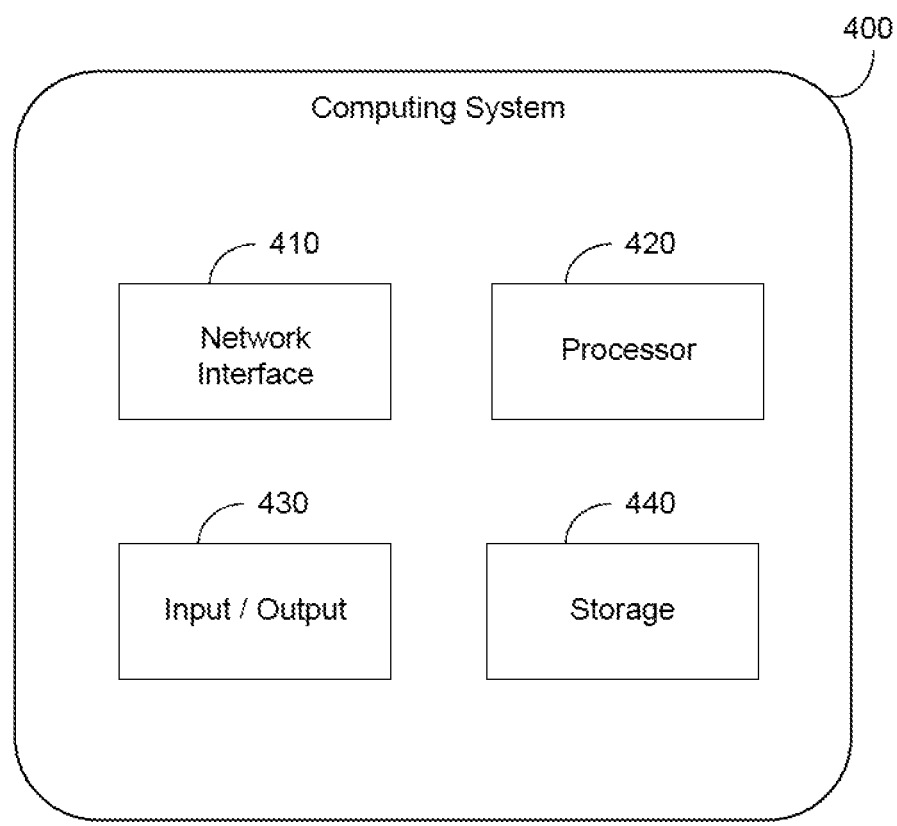
FIG. 4 is a diagram illustrating a computing system for use in the examples herein in accordance with an example embodiment.

FIG. 4 illustrates a computing system 400 that may be used in any of the methods and processes described herein, in accordance with an example embodiment. For example, the computing system 400 may be a database node, a server, a cloud platform, or the like. In some embodiments, the computing system 400 may be distributed across multiple computing devices such as multiple database nodes. Referring to FIG. 4, the computing system 400 includes a network interface 410, a processor 420, an input/output 430, and a storage 440 such as an in-memory storage, and the like. Although not shown in FIG. 4, the computing system 400 may also include or be electronically connected to other components such as a display, an input unit(s), a receiver, a transmitter, a persistent disk, and the like. The processor 420 may control the other components of the computing system 400.

The network interface 410 may transmit and receive data over a network such as the Internet, a private network, a public network, an enterprise network, and the like. The network interface 410 may be a wireless interface, a wired interface, or a combination thereof. The processor 420 may include one or more processing devices each including one or more processing cores. In some examples, the processor 420 is a multicore processor or a plurality of multicore processors. Also, the processor 420 may be fixed or it may be reconfigurable. The input/output 430 may include an interface, a port, a cable, a bus, a board, a wire, and the like, for inputting and outputting data to and from the computing system 400. For example, data may be output to an embedded display of the computing system 400, an externally connected display, a display connected to the cloud, another device, and the like. The network interface 410, the input/output 430, the storage 440, or a combination thereof, may interact with applications executing on other devices.

The storage 440 is not limited to a particular storage device and may include any known memory device such as RAM, ROM, hard disk, and the like, and may or may not be included within a database system, a cloud environment, a web server, or the like. The storage 440 may store software modules or other instructions which can be executed by the processor 420 to perform the methods described herein. According to various embodiments, the storage 440 may include a data store having a plurality of tables, records, partitions and sub-partitions. The storage 440 may be used to store database records, documents, entries, and the like.

According to various embodiments, the storage 440 may store a software application and a dependent data set that stores enterprise resource planning (ERP) data and other business data of an organization. The processor 420 may output a user interface of the software application for display and it may be accessible via a URL. The user interface may be used to trigger a product availability check based on the business data of the organization.

For example, the processor 420 may receive a database request comprising a requested quantity value of a data item. The processor 420 may set an exclusive lock for the database request on the data item within a database. The processor 420 may read a current value of the data item from the database and assign the requested quantity value of the data item to the database request based on the current value. Furthermore, the processor 420 may store a record of the assignment to the database request within a table, wherein the record comprises an identifier of the requested quantity value, an identifier of the database request, and a timestamp of the database request. The processor 420 may release the exclusive lock for the database request on the data item within the database in response to recording the assignment.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory medium.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
receive a database request comprising a requested quantity value of a data item,
determine a unique database request timestamp specific to the database request,
set an exclusive lock for the database request on the data item within a database,
protect the requested quantity value by posting a temporary quantity assignment (TQA) for the database request to a table, wherein the TQA comprises an identifier of the requested quantity value, an identifier of the database request, and a TQA timestamp,
release the exclusive lock for the database request on the data item within the database in response to recording the TQA, and
with the exclusive lock released, determine a quantity value of the data item which is available for the database request and confirm the determined quantity via the temporary quantity assignment table.

2. The computing system of claim 1, wherein the processor is further configured to read a previously assigned value of the data item to a different database request from the table and determine the quantity value of the data item which is available by subtracting the previously assigned value of the data item from a current value of the data item.

3. The computing system of claim 2, wherein the processor is configured to determine that only a partial quantity value of the requested quantity value for the item is available, and confirm the partial quantity value by modifying the TQA posted in the table.

4. The computing system of claim 3, wherein the processor is further configured to transmit a response to a software application that submitted the database request with an identifier of the confirmed partial quantity value.

5. The computing system of claim 1, wherein the processor is configured to receive an availability check request from a software application and generate the database request in response to the availability check request.

6. The computing system of claim 1, wherein the processor is further configured to receive a second database request for the data item comprising a second requested quantity value of the data item after the exclusive lock for the database request has been released, and set a second exclusive lock on the data item within the database.

7. The computing system of claim 1, wherein the processor is further configured to release the exclusive lock for the database request on the data item within the database after detecting that the requested quantity value has been protected within the table.

8. The computing system of claim 1, wherein the processor is further configured to exclude a quantity value in another TQA stored within the table when determining the quantity value that is available, in response to a timestamp within the assignment record being later in time than the timestamp of the database request.

9. A method comprising:
receiving a database request comprising a requested quantity value of a data item;
determining a unique database request timestamp specific to the database request;
setting an exclusive lock for the database request on the data item within a database;
protecting the requested quantity value by posting a temporary quantity assignment (TQA) for the database request to a table, wherein the TQA comprises an identifier of the requested quantity value, an identifier of the database request, and a TOA timestamp;
releasing the exclusive lock for the database request on the data item within the database in response to recording the TQA; and
with the exclusive lock released, determining a quantity value of the data item which is available for the database request and confirming the determined quantity via the temporary quantity assignment table.

10. The method of claim 9, wherein the determining comprises reading a previously assigned value of the data item to a different database request from the table and determining the quantity value of the data item which is available by subtracting the previously assigned value of the data item from a current value of the data item.

11. The method of claim 10, wherein the determining comprises determining that only a partial quantity value of the requested quantity value for the item is available, and confirm the partial quantity value by modifying the TQA posted in the table.

12. The method of claim 11, wherein the method further comprises transmitting a response to a software application that submitted the database request with an identifier of the confirmed partial quantity value.

13. The method of claim 9, wherein the receiving comprises receiving an availability check request from a software application and generating the database request in response to the availability check request.

14. The method of claim 9, wherein the method further comprises receiving a second database request for the data item comprising a second requested quantity value of the data item after the exclusive lock for the database request has been released, and setting a second exclusive lock on the data item within the database.

15. The method of claim 9, wherein the releasing comprises releasing the exclusive lock for the database request on the data item within the database after detecting that the requested quantity value has been protected within the table.

16. The method of claim 9, wherein the determining comprises excluding a quantity value in another TQA stored within the table when determining the quantity value that is available, in response to a timestamp within the assignment record being later in time than the timestamp of the database request.

17. A computer-readable storage medium comprising instructions which when executed by a processor cause a computer to perform a method comprising:
receiving a database request comprising a requested quantity value of a data item;
determining a unique database request timestamp specific to the database request;
setting an exclusive lock for the database request on the data item within a database;
protecting the requested quantity value by posting a temporary quantity assignment (TQA) for the database request to a table, wherein the TQA comprises an identifier of the requested quantity value, an identifier of the database request, and a TOA timestamp;
releasing the exclusive lock for the database request on the data item within the database in response to recording the TQA; and
with the exclusive lock released, determining a quantity value of the data item which is available for the database request and confirming the determined quantity via the temporary quantity assignment table.

18. The computer-readable medium of claim 17, wherein the method further comprises reading a previously assigned value of the data item to a different database request from the table and determining to assign the requested quantity value of the data item to the database request based on a current value of the data item minus the previously assigned value of the data item read from the table.

19. The computer-readable medium of claim 17, wherein the receiving comprises receiving an availability check request from a software application and generate the database request in response to the availability check request.

20. The computer-readable medium of claim 17, wherein the receiving comprises receiving a second database request for the data item comprising a second requested quantity value of the data item after the exclusive lock for the database request has been released, and setting a second exclusive lock on the data item within the database.

* * * * *